United States Patent
Yu

(10) Patent No.: US 6,612,282 B2
(45) Date of Patent: Sep. 2, 2003

(54) COMBUSTION CHAMBER FOR DISI ENGINE

(75) Inventor: Chul-Ho Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/256,106

(22) Filed: Sep. 26, 2002

(65) Prior Publication Data

US 2003/0056748 A1 Mar. 27, 2003

(30) Foreign Application Priority Data

Sep. 26, 2001 (KR) .......................... 2001-59601

(51) Int. Cl.$^7$ ................................. F02B 19/08
(52) U.S. Cl. ................. 123/262; 123/279; 123/298
(58) Field of Search ..................... 123/262, 279, 123/276, 298

(56) References Cited

U.S. PATENT DOCUMENTS

| | | | | |
|---|---|---|---|---|
| 5,127,379 A | * | 7/1992 | Kobayashi et al. | 123/302 |
| 6,223,715 B1 | * | 5/2001 | Suzuki | 123/294 |
| 6,443,122 B1 | * | 9/2002 | Denbratt et al. | 123/301 |
| 6,532,933 B1 | * | 3/2003 | Tanaka et al. | 123/305 |

* cited by examiner

Primary Examiner—Bibhu Mohanty
(74) Attorney, Agent, or Firm—Pennie & Edmonds LLP

(57) ABSTRACT

A direct-injection spark-ignited engine is provided that includes a combustion chamber formed between a lower surface of a cylinder head and an upper surface of a piston. An intake and an exhaust valve are respectively disposed in an intake port and an exhaust port. These ports are respectively disposed on each side of the cylinder head. A spark plug is disposed in the cylinder head. A fuel injector directly injects fuel into the combustion chamber. A bowl is formed in the upper surface of the piston for generating a turbulent air flow.

13 Claims, 4 Drawing Sheets

COMBUSTION CHAMBER FOR DISI ENGINE

FIELD OF THE INVENTION

The present invention relates to a gasoline direct injection engine, and more particularly, to an engine in which intake air flow is turbulence is increased so as to increase fuel economy and decrease an amount of noxious exhaust gas during cold start.

BACKGROUND OF THE INVENTION

Generally, a gasoline direct-injection and spark-ignited engine (hereinafter referred to as a DISI engine) is an engine that has advantages of both a gasoline engine and a diesel engine. In the DISI engine, fuel is directly injected into a combustion chamber.

In the DISI engine, intake flow is a very important factor in determining engine efficiency. The intake flow is determined by the shape of the intake ports, the combustion chamber, and the pistons. Research on intake flow characteristics has continuously been undertaken to prevent wall flow of the intake air and to make the intake air mix with the fuel in a short time period.

Various such engines are described in the art. For example, the DISI engine disclosed in Japanese patent publication number 4-166612, has a bowl formed in an upper surface of the piston. The bowl extends from a position under the spark plug to a position under the fuel injector. The bowl is substantially spherical, and a fuel guide groove is formed proximate to the bowl under the spark plug. Fuel injected from the fuel injector collides with a bottom surface of the bowl and moves along the fuel guide groove. Then, the injected fuel concentrates around the spark plug so that ignitability of the fuel increases.

In another example, Korean patent publication number 1997-703481 discloses a DISI engine with a bowl again formed on an upper surface of the piston. A turbulent flow is generated to some extent when fuel passes from a lower portion of a cylinder head to an upper portion of the piston, and then from the upper portion of the piston to the lower portion of the cylinder head.

However, in the above DISI engines, as in the prior art in general, the turbulence of the flow is relatively low such that it is difficult to generate a uniformly diffused air-fuel mixture. Furthermore, because a majority of the injected fuel collides with the surface of a bowl, it takes a relatively long time for the fuel to vaporize. Therefore, the late-vaporized fuel burns late so that it is imperfectly burned. As a result, soot and hydrocarbon emissions increase. In particular, while the piston is not sufficiently heated, an amount of emissions becomes very large.

SUMMARY OF THE INVENTION

In a preferred embodiment of the present invention, a combustion chamber is formed between a lower surface of a cylinder head and an upper surface of a piston. An intake valve and an exhaust valve, respectively, are disposed in an intake port and an exhaust port. These ports are respectively disposed on each side of the cylinder head. A spark plug is disposed in the cylinder head. A fuel injector directly injects fuel into the combustion chamber. Preferably, the combustion chamber is formed between the lower surface of the cylinder head and the upper surface of the piston. The lower surface of the cylinder head includes a first intake-valve-side slanted surface and a first exhaust-valve-side slanted surface. The upper surface of the piston includes a second intake-valve-side slanted surface corresponding to the first intake-valve-side slanted surface and a second exhaust-valve-side slanted surface corresponding to the first exhaust-valve-side slanted surface. Also, a bowl is formed in the upper surface of the piston. The bowl preferably extends from the second exhaust-valve-side slanted surface to the second intake-valve-side slanted surface. The depth of the bowl increases on approach to the second intake-valve-side slanted surface.

In a further preferred embodiment the direct-injection spark-ignited engine of the present invention further comprises a wall disposed in the intake port. The wall divides the intake port into an upper passageway and a lower passageway. A valve, coupled to an inlet portion of the lower passageway, selectively opens and closes the lower passageway.

It is also preferable that an intake-valve-sided ramp of the bowl is substantially vertical. More preferably, the bowl has a substantially trapezoidal shape seen from above, and a width of the exhaust-valve-side portion of the bowl is greater than a width of the intake-valve-side portion of the bowl. It is further preferred that a bottom surface of the bowl includes an upward projection part near a center position of the bowl.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
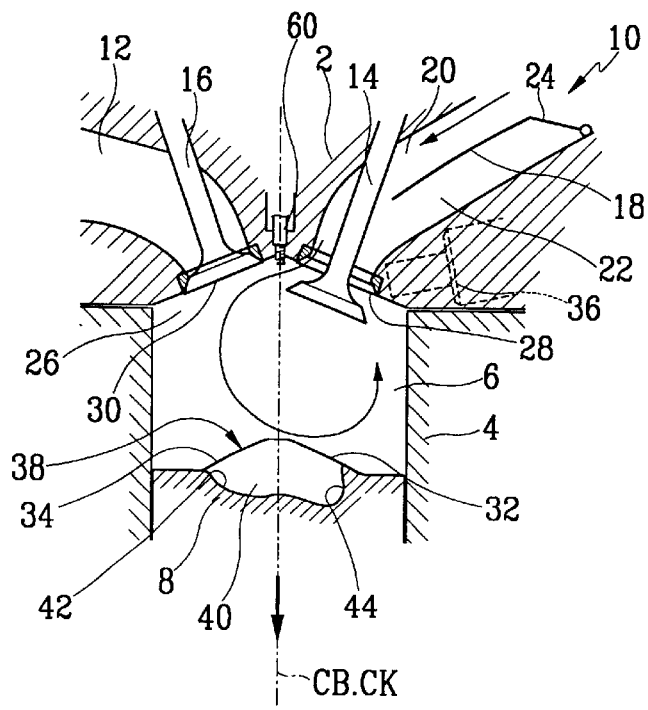
FIG. 1 is a sectional view of the engine according to the preferred embodiment of the present invention.

As shown in FIG. 1, an embodiment of an engine according to the present invention includes a cylinder block 4 defining a cylinder bore 6, and a cylinder head 2. A piston 8 is vertically movably inserted in the cylinder bore 6. A spark plug 60 for igniting an air-fuel mixture is disposed in the cylinder head 2. The cylinder head 2 includes an intake port 10 and an exhaust port 12, and the number of the intake and exhaust ports depends on to the number of intake and exhaust valves 14 and 16.

A wall 18 is disposed in an output stream of the intake port 10, which divides the intake port into an upper passageway 20 and a lower passageway 22. A valve 24 is disposed in an entrance portion of the lower passageway 22, and selectively opens and closes the lower passageway 22. Valve 24 is operated by a drive motor (not shown) that is controlled by an engine control unit (not shown).

According to engine operating conditions, valve 24 is controlled to be opened or closed by the engine control unit. When the air-fuel mixture is lean, valve 24 is controlled to be closed such that air is taken into combustion chamber 26 in a turbulent state through the upper passageway 20.

The combustion chamber 26 is formed between a lower wall of the cylinder head 2 and an upper surface of the piston 8. The lower wall of the cylinder head 2 includes a slanted first side 28 and a slanted second side 30, respectively disposed on each side of an imaginary plane CK, formed along center axis CB of the cylinder bore 6 and a center axis of a crankshaft (not shown). That is, the lower wall of the cylinder head 2 is substantially "^" shaped. Intake port 10 is located in the first slanted side 28 of the cylinder head 2, and the exhaust port 12 is located in the second slanted side 30 of the cylinder head 2.

The upper surface of the piston 8 also has two sides 32 and 34 that respectively correspond to the two sides 28 and 30 of the lower wall of the cylinder head 2. The first side 32 is located under the intake port 10, and the second side 34 is located under the exhaust port 12. The upper surface of the piston 8 is substantially "^" shaped. That is, the upper surface of the piston 8 protrudes upwardly.

A fuel injector 36 for directly injecting fuel into the combustion chamber 26 is disposed in the cylinder head 2 proximate to the intake port 10. Injection timing and duration of injection from the fuel injector 36 are controlled by the engine control unit.

Figure 2:
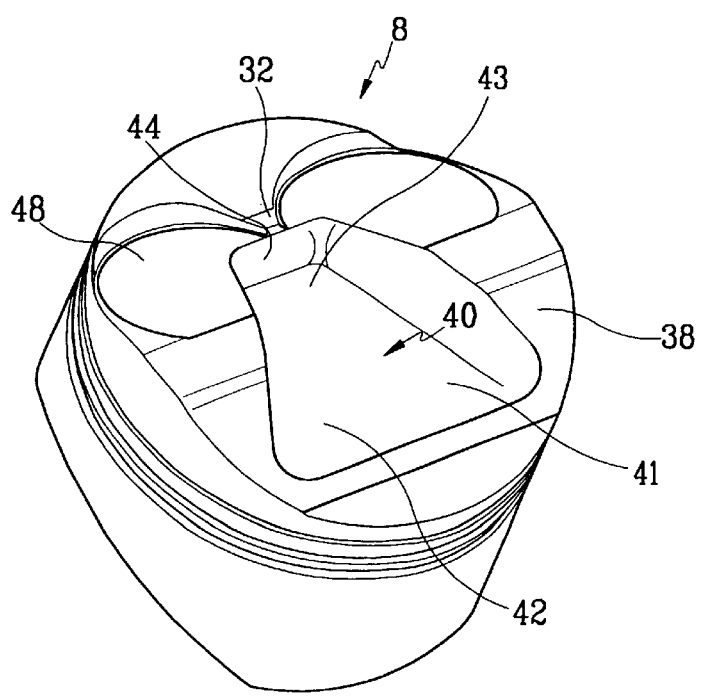
FIG. 2 is a perspective view of the piston of the engine of FIG. 1.
Figure 3:
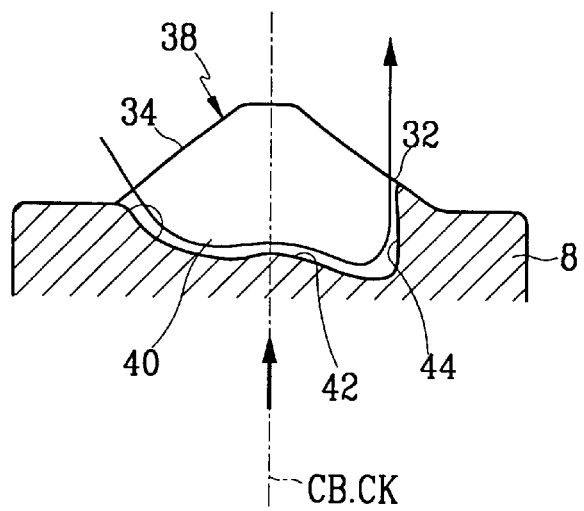
FIG. 3 is a sectional view of the piston of FIG. 2.
Figure 4:
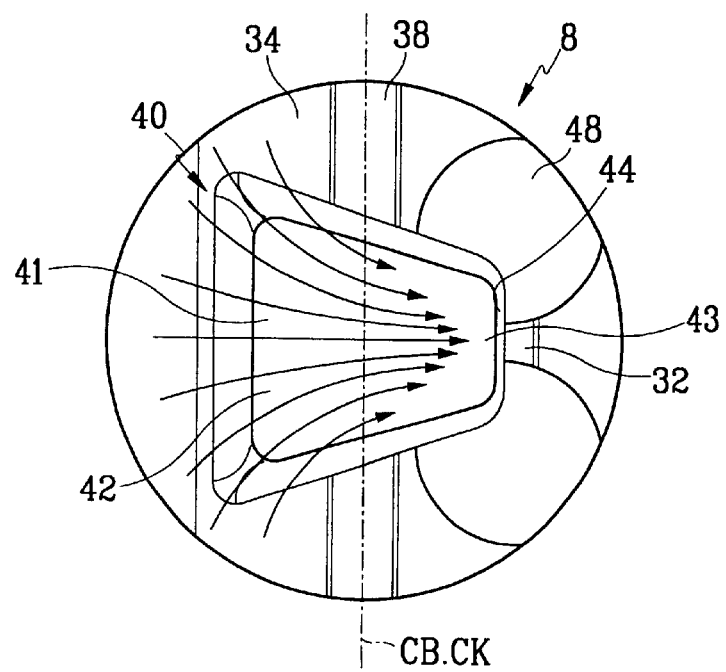
FIG. 4 is a top view of the piston of FIG. 2.

As shown in FIGS. 2 and 3, a bowl 40 is disposed in the upper surface of the piston 8. The bowl 40 extends from the second side 34 of the upper surface of the piston 8 to the first side 32 of the upper surface of the piston 8. As seen in the above, the bowl 40 has a substantially trapezoidal configuration, as shown in FIG. 4. The width of the bowl 40 is larger on the second side 34 than on the first side 32. The width of the bowl 40 becomes narrower approaching the first side 32, and the depth of the bowl 40 substantially increases on approach to the first side 32.

The bowl 40 is generally biased to the second side 34 of the upper surface of the piston 8, and the bottom surface 42 of the bowl 40 protrudes slightly upward near the imaginary plane CK. A ramp portion 44 of the bowl 40 is substantially vertical. With such a configuration of bowl 40, the air-fuel mixture injected into the combustion chamber 26 passes from a first portion 41 of the bowl to a second portion 43 of the bowl. Because the width of the second portion 43 is smaller than the width of the first portion 41, the speed of flow increases while the air-fuel mixture passes through the bowl 40. After the air-fuel mixture collides with the vertical ramp 44, the flow of the air-fuel mixture is disturbed to create relatively high turbulence, and then the flow moves to the spark plug 60.

Figure 5:
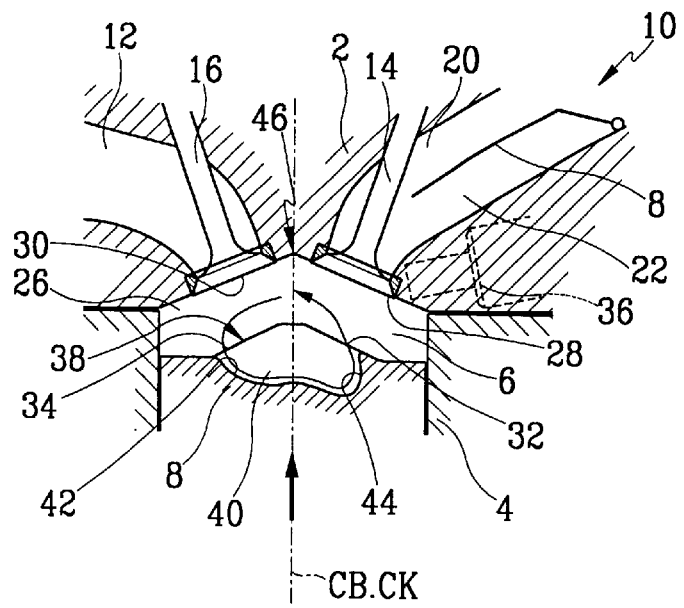
FIG. 5 shows a compressing process of the engine according to the preferred embodiment of the present invention.
Figure 6:
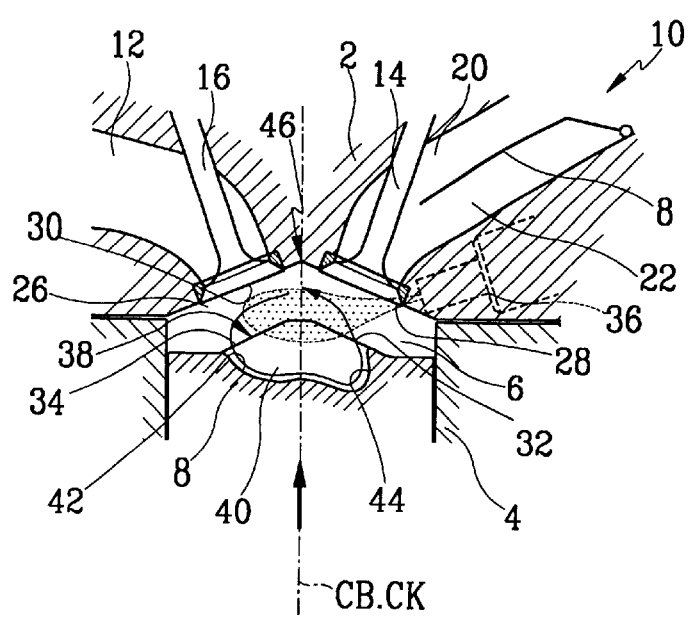
FIG. 6 shows a fuel injection process of the engine according to the preferred embodiment of the present invention.
Figure 7:
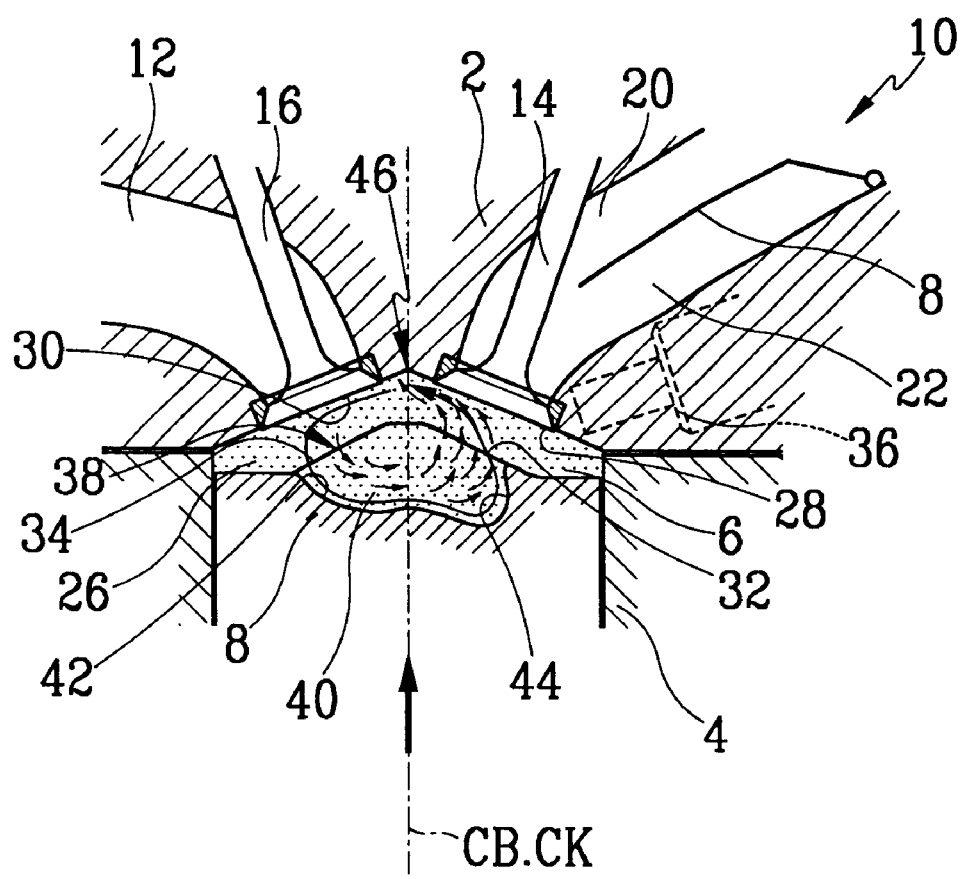
FIG. 7 shows a flow of air-fuel mixture of the engine according to the preferred embodiment of the present invention.

As shown in FIG. 5, when the piston 8 is located at top dead center, a compact combustion chamber 26 is formed between the lower wall of the cylinder head 2 and the bowl 40. A plurality of pockets 48 (FIG. 4) are formed on the upper surface of the piston 8 to prevent an intake valve 14 from colliding with the upper surface of the piston 8 when the intake valve 14 is open in this piston position.

In the engine according to an embodiment of the present invention, when piston 8 moves down for taking the air into the combustion chamber, the air that passes through the upper passageway 20 is agitated to form a more turbulent flow. When piston 8 moves upward for compressing the air, the flow of the air passes through the bowl 40. After the air flow collides with the ramp 44 of the bowl 40, the air flow is highly turbulent.

When fuel is injected into the combustion chamber at this point, the injected fuel is mixed with the turbulent flow of air. The fuel is therefore vaporized in a relatively short time period, without contacting the surface 42 of the bowl 40, so a major part of the injected fuel is burned.

In the present invention, because high turbulence is generated inside the combustion chamber, agitation of the air flow in the intake port is not needed. Therefore, a pumping loss in the intake port is decreased, and fuel economy and output power of the engine according to the present invention are improved.

As stated above, in the DISI engine according to the present invention, highly turbulent flow is generated, and fuel injected from the fuel injector is vaporized without colliding with the surface of the bowl. Therefore, the fuel is burned after being sufficiently vaporized so that the amount of the exhausted soot is substantially decreased. Also, the amount of exhausted hydrocarbons is decreased because of the reduction of the wall flow. Furthermore, high turbulence and quick vaporization minimizes the amount of noxious gas emissions during cold start.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A direct-injection spark-ignited engine comprising:
    a combustion chamber formed between a lower surface of a cylinder head and an upper surface of a piston;
    an intake and an exhaust valve respectively disposed in an intake port and an exhaust port that are respectively disposed on each side of said cylinder head;
    a spark plug disposed in said cylinder head; and
    a fuel injector for directly injecting fuel into said combustion chamber,
    wherein said lower surface of said cylinder head defines a first intake-valve-side slanted surface and a first exhaust-valve-side slanted surface, said upper surface of said piston defines a second intake-valve-side slanted surface corresponding to said first intake-valve-side slanted surface and a second exhaust-valve-side slanted surface corresponding to said first exhaust-valve-side slanted surface, and
    wherein a bowl is formed in the upper surface of the piston, said bowl extending from said second exhaust-valve-side slanted surface to said second intake-valve-side slanted surface, said bowl having a depth increasing on approach to said second intake-valve-side slanted surface.

2. The direct-injection spark-ignited engine of claim 1, further comprising a wall disposed in said intake port, said wall dividing said intake port into an upper passageway and a lower passageway.

3. The direct-injection spark-ignited engine of claim 2, further comprising a valve coupled to an inlet portion of said lower passageway such that said valve selectively opens and closes said lower passageway.

4. The direct-injection spark-ignited engine of claim 1, wherein an intake-valve-side ramp of said bowl is substantially vertical.

5. The direct-injection spark-ignited engine of claim 1, wherein said bowl has a substantially trapezoidal shape seen from above, with a width of an exhaust-valve-side portion of said bowl being greater than a width of an intake-valve-side portion of said bowl.

6. The direct-injection spark-ignited engine of claim 1, wherein a bottom surface of said bowl includes an upward projection part near a center position of said bowl.

7. The direct-injection spark-ignited engine of claim 1, wherein said spark plug is mounted on said first intake-valve-side slanted surface of said cylinder head.

8. A direct-injection spark-ignited engine comprising:
   a cylinder block defining a cylinder bore;
   a cylinder head closing one end of said cylinder bore, a lower wall of said cylinder head including a first intake-valve-side slanted surface and a first exhaust-valve-side slanted surface;
   an intake and an exhaust valve respectively disposed in an intake port and an exhaust port that are respectively disposed on each side of said cylinder head;
   a piston vertically movably inserted into said cylinder bore, said piston having an upper surface including a second intake-valve-side slanted surface corresponding to said first intake-valve-side slanted surface and a second exhaust-valve-side slanted surface corresponding to said first exhaust-valve-side slanted surface;
   a spark plug disposed in said cylinder head; and
   a bowl formed in said upper surface of said piston, said bowl extending from said second exhaust-valve-side slanted surface to said second intake-valve-side slanted surface, said bowl having a substantially trapezoidal shape seen from above, a width of an exhaust-valve-side portion of said bowl being greater than a width of an intake-valve-side portion of said bowl.

9. The direct-injection spark-ignited engine of claim 8, further comprising a wall disposed in said intake port, said wall dividing said intake port into an upper passageway and a lower passageway.

10. The direct-injection spark-ignited engine of claim 9, further comprising a valve coupled to an inlet portion of said lower passageway such that said valve selectively opens and closes said lower passageway.

11. The direct-injection spark-ignited engine of claim 8, wherein a depth of said bowl increases on approach to said second intake-valve-side slanted surface.

12. The direct-injection spark-ignited engine of claim 8, wherein an intake-valve-side ramp of said bowl is substantially vertical.

13. The direct-injection spark-ignited engine of claim 8, further comprising a cylindrical pocket formed on said upper surface of said piston.

\* \* \* \* \*